June 10, 1947.   D. G. C. LUCK   2,422,026
RADIO DIRECTION FINDING
Filed July 28, 1943
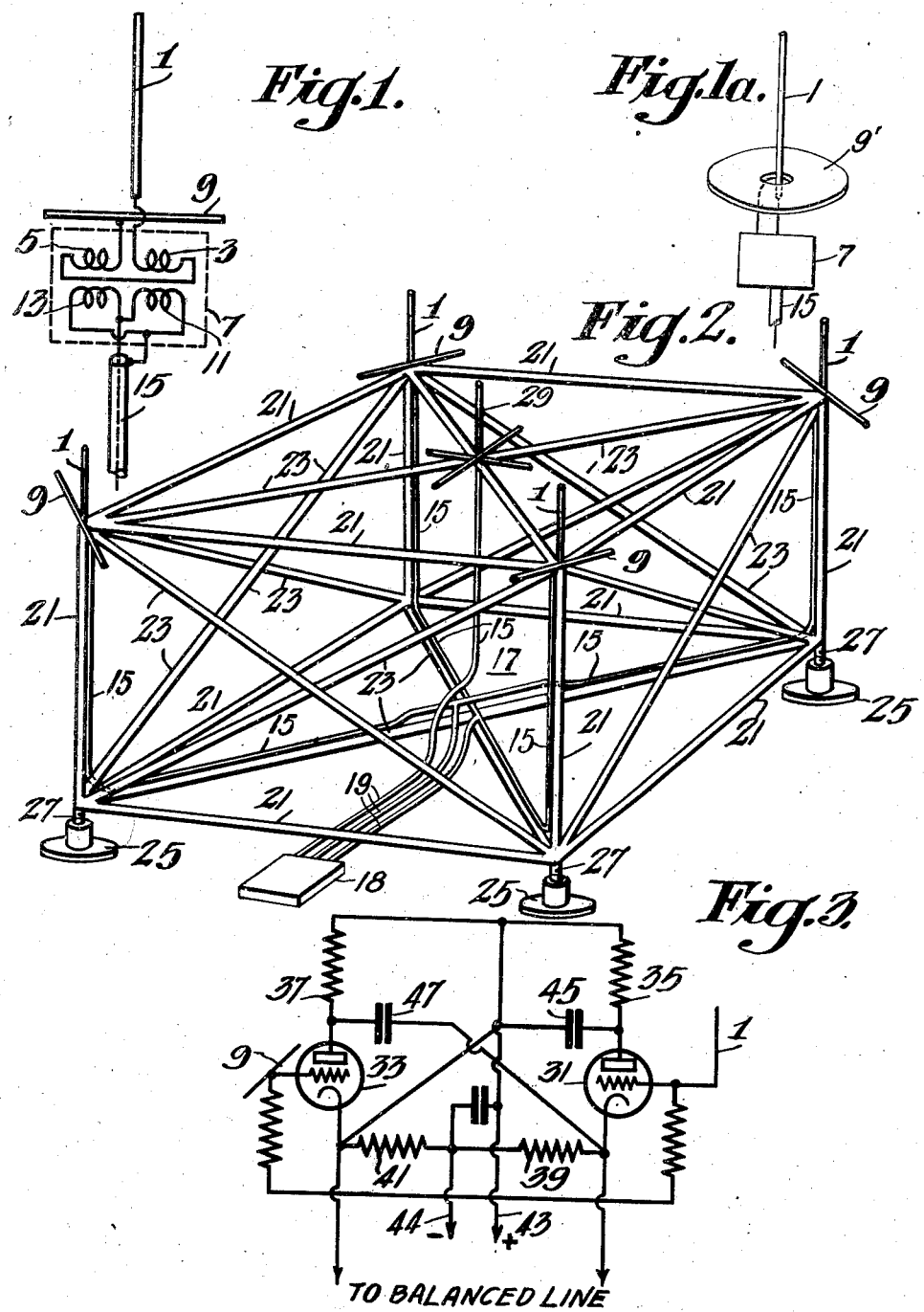
Inventor
David G. C. Luck
By
CD Tuska
Attorney Patented June 10, 1947

2,422,026

UNITED STATES PATENT OFFICE 2,422,026

RADIO DIRECTION FINDING

David G. C. Luck, Hightstown, N. J., assignor to Radio Corporation of America, a corporation of Delaware Application July 28, 1943, Serial No. 496,461

6 Claims. (Cl. 250—33)

This invention relates to radio direction finding, and more particularly to improvements in directional antennas of the Adcock type.

Adcock arrays in general comprise pairs of spaced vertical collector elements, interconnected to provide from each pair a combined output voltage which is related in its magnitude to the phase difference between the voltage picked up by the individual collector elements. Owing to the fact that the vertical collectors can respond only to vertical electrical field components, such arrays should be substantially less affected by so called "polarization errors" than loops and other directional antennas. However, horizontal conductors are required for connecting the vertical collector elements to the utilization circuit. These conductors may be cross-connected, as in the H-type Adcock array, to provide cancellation of the voltage produced therein by horizontal electrical field components, or shielded as in the U-type Adcock array, to prevent response to horizontally polarized energy.

In the case of the H-type Adcock, the proximity of the earth upsets the symmetry and prevents accurate balancing over a frequency band of practically useful width. Also the horizontal conductors are elevated and freely exposed to horizontal field components so that their pickup is very great; therefore, extremely accurate balancing is necessary. In the U-type Adcock system currents are induced in the horizontal surfaces of the shields by horizontal field components. These surfaces are coupled to the vertical collector elements, thus causing the system to respond to the undesired horizontally polarized fields. If the ground surface is not homogeneous in the region of the antenna, currents induced therein are also coupled into the system. This effect is particularly apparent when a conductive ground mat is employed. Since the signals derived from the horizontal field components bear no simple relationship to the direction of wave arrival and are super-imposed upon the signals produced by the vertical field components, serious errors may be introduced when the wave polarization is such that a strong horizontal component exists.

The principal object of this invention is to provide an improved method of and means for preventing response to horizontal field components by an Adcock type directional antenna array.

Another object is to provide improved means which combine the advantages and eliminate the disadvantages of the H- and U-type Adcock systems.

A further object is to provide means for minimizing the effects of inhomogeneity of the ground on antenna equality.

These and other objects will become apparent to those skilled in the art, upon consideration of the following description with reference to the accompanying drawing, of which Fig. 1 is a schematic diagram of a vertical collector element, provided with a ground rod in accordance with the invention, Fig. 1a is a schematic diagram of a modification of the structure of Fig. 1. Fig. 2 is a view in perspective of an antenna system according to the invention, illustrating a supporting and aligning framework, and Fig. 3 is a schematic circuit diagram of a modification of Fig. 1.

In the practice of the instant invention, the horizontal interconnections are kept on or below the ground, as in the U-Adcock, while the residual horizontal pickup on these conductors is reduced by using suitable elevated antennas balanced to ground, as in the H-Adcock.

Referring to Fig. 1, each collector comprises a vertical rod 1, connected through the primary windings 3 and 5 of a transformer 7 to the center of a horizontal rod 9. A horizontal disk 9' or other symmetrical body may be substituted for the rod 9, as illustrated in Fig. 1a, without substantially altering the characteristics of the system. The primary windings 3 and 5 are coupled to secondaries 11 and 13 on the transformer 7. The secondaries 11 and 13 are connected to a feeder line 15, which extends down to the surface of the earth and thence horizontally to a utilization circuit (not shown). The antenna 1 and the rod 9 are so proportioned as to be balanced to ground and to the line 15.

In operation, the horizontal rod 9 functions as a dummy ground for the collector 1. Currents flowing from the collector 1 through the windings 5 and 3 to the rod 9 induce currents in the secondaries 11 and 13, which are applied to the line 15. The symmetrical mechanical arrangement and symmetrical electrical connection of the ground rod 9 to the antenna 1 prevents the coupling into the antenna of horizontal pickup on the ground rod itself.

Fig. 2 shows a preferred embodiment of the invention, in which accurate alignment of the collector elements is provided by a supporting framework of non-conductive material in the the form of a rectangular parallelepiped. Twelve edge members 21 and twelve face diagonals 23 are assembled as shown. The structure may be demountable if desired, the members 21 and 23 being provided with fittings for rapid assembly and disassembly. The bottom surface is adapted to rest on four bearing pads 25, provided with adjusting means 27 for levelling. The antennas 1 and ground rods 9 each similar to the arrangement illustrated in Fig. 1, are demountably filled in sockets secured to the four upper corners of the frame. A fifth antenna 29, for sense finding or radiation injection, may be mounted at the intersection of the upper face diagonals.

The feeders 15 run vertically down to the ground, and horizontally along the ground to a point 17, equidistant from the antennas 1. The utilization device, such as a radio receiver 18, may be located at the point 17 or may be connected to the lines 15 at the point 17 through lines 19. Two pairs of collectors are arranged on orthogonal lines and connected as in the usual Adcock system. Since the only horizontal conductors which are capable of effectively picking up horizontally polarized energy are at the ground level, coupling to the elevated collector elements is small. Furthermore, the pickup of horizontally polarized energy by these conductors is low because they are at the ground surface, as in the U-type Adcock. Thus, only moderate reduction of the coupling of this small residual pickup to the antennas is necessary in order to achieve unusually low polarization error.

Referring to Fig. 3, an electronic transformer is substituted for the inductive coupling means of Fig. 1, and the collector is arranged to operate into a two-wire balanced line instead of a coaxial line as in Fig. 1. The vertical conductor 1 and the horizontal conductor 9 are connected to the control grids of a pair of electronic tubes 31 and 33 respectively. Resistors 35 and 37 are connected in the anode circuits of the tubes 31 and 33, and resistors 39 and 41 are provided in the corresponding cathode circuits. Anode potential for the tubes 31 and 33 is applied through wires 43 and 44 which extend to a source, not shown, at the bottom of the supporting structure. The cathodes of the tubes 31 and 33 are connected to the terminals of the balanced two-wire line which extends vertically downward to the ground surface and then horizontally to the utilization circuit as in the system of Fig. 2. Capacitors 45 and 47 are cross connected between the anodes and cathodes of the tubes 31 and 33 for neutralization, so that none of the output voltage is fed back to the elements 1 and 9. The tubes 31 and 33, with their associated circuits are positioned adjacent the collector elements 1 and 9, and energy for heating the cathodes is provided through wires extending along the vertical supports together with the transmission line and the anode supply wires 43 and 44.

In operation the system functions in the same manner as that shown in Fig. 1. The elements 1 and 9 are balanced with respect to the transmission line and the ground. The tubes 31 and 33 operate as cathode followers, providing output voltages across their cathode resistors which are substantially equal to the voltages applied to their respective control grids, and are substantially independent of the electrical loads placed across the cathode resistors. Thus the voltage appearing between each side of the balanced line and ground is equal to that between each of the elements 1 and 9 and ground.

Thus the invention has been described as an improved direction finder antenna system. Vertical collector elements are supported at a substantial elevation, with feeders extending vertically to the ground surface, the horizontal connections being made at the surface. Dummy grounds are provided at the collectors, comprising horizontal conductors connected at their centers to the return circuits of the collectors. Coupling between the horizontal connections and the collectors is minimized by the elevation of the collectors, and pickup of horizontally polarized energy by the horizontal connections is kept low by proximity to the ground surface. Although the invention has been described as an Adcock type array, it is to be understood that the reverse connections between the antennas of each pair, typical of Adcock systems, need not be employed. For example, it is within the contemplation of the invention to provide a separate receiver or frequency converter channel for each collector, comparing the signals picked up by the several antenna elements after separate conversion or demodulation.

I claim as my invention:

1. A wave collector element for radio direction finders comprising a vertical conductor, a horizontal conductor, means for supporting both of said conductors at a substantial elevation above the ground surface, with the midpoint of said horizontal conductor adjacent the lower end of said vertical conductor, transducer means including an input circuit connected between the lower end of said vertical conductor and the midpoint of said horizontal conductor, and vertically disposed transmission line means connected to said transducer means whereby said vertical and horizontal conductors are electrically balanced with respect to said transmission line.

2. A wave collector system for radio direction finders including a vertical conductive rod disposed at a substantial elevation above the ground surface, a horizontal conductor disposed adjacent and symmetrically with respect to the lower end of said rod, transmission line means extending vertically downward from the midpoint of said horizontal conductor, and transformer means provided with an input circuit connected in balance with respect to said transmission line means, between said lower end of said rod and said midpoint, and an output circuit connected to said transmission line means.

3. The invention as set forth in claim 2 wherein said horizontal conductor comprises a rod.

4. A radio direction finder system including a plurality of vertical conductive rods disposed at a substantial elevation above the ground surface, horizontal conductive members disposed with their midpoints respectively adjacent the lower ends of said vertical rods, transmission lines coupled to said respective lower ends and said midpoints and extending vertically downward to the ground surface.

5. A radio direction finder system including a plurality of vertical conductive rods disposed at a substantial elevation above the ground surface, horizontal conductive members disposed with their midpoints respectively adjacent the lower ends of said vertical rods, transmission lines coupled to said respective lower ends and said midpoints and extending vertically downward to the ground surface, said transmission lines extending horizontally along the ground surface to a point thereon substantially equidistant from said vertical conductive rods.

6. The invention as set forth in claim 2 wherein said horizontal conductor comprises a disc.

DAVID G. C. LUCK.

REFERENCES CITED

The following references are of record in the file of this patent:

UNITED STATES PATENTS

| Number | Name | Date |
| --- | --- | --- |
| 2,083,416 | Aiken | June 8, 1937 |
| 2,213,281 | Koschmieder | Sept. 3, 1940 |
| 2,248,762 | Kramar et al. | July 8, 1941 |
| 2,189,910 | Kramar | Feb. 13, 1940 |
| 2,213,281 | Koschmieder | Sept. 3, 1940 |

FOREIGN PATENTS

| Number | Country | Date |
| --- | --- | --- |
| 130,490 | Great Britain | Aug. 7, 1919 |
| 439,714 | Great Britain | Dec. 12, 1935 |
| 479,689 | Great Britain | Feb. 8, 1938 |